March 29, 1960 W. PALMER 2,930,892

DEMODULATOR FOR A PHASE OR FREQUENCY MODULATED SIGNAL

Filed March 26, 1954

INVENTOR

WINSLOW PALMER

BY

Thomas M. Ferrill, Jr.

ATTORNEY

United States Patent Office 2,930,892
Patented Mar. 29, 1960

2,930,892

DEMODULATOR FOR A PHASE OR FREQUENCY MODULATED SIGNAL

Winslow Palmer, West Hempstead, N.Y., assignor to Sperry Rand Corporation, a corporation of Delaware Application March 26, 1954, Serial No. 418,893

4 Claims. (Cl. 250—27)

Figures 1, 2:
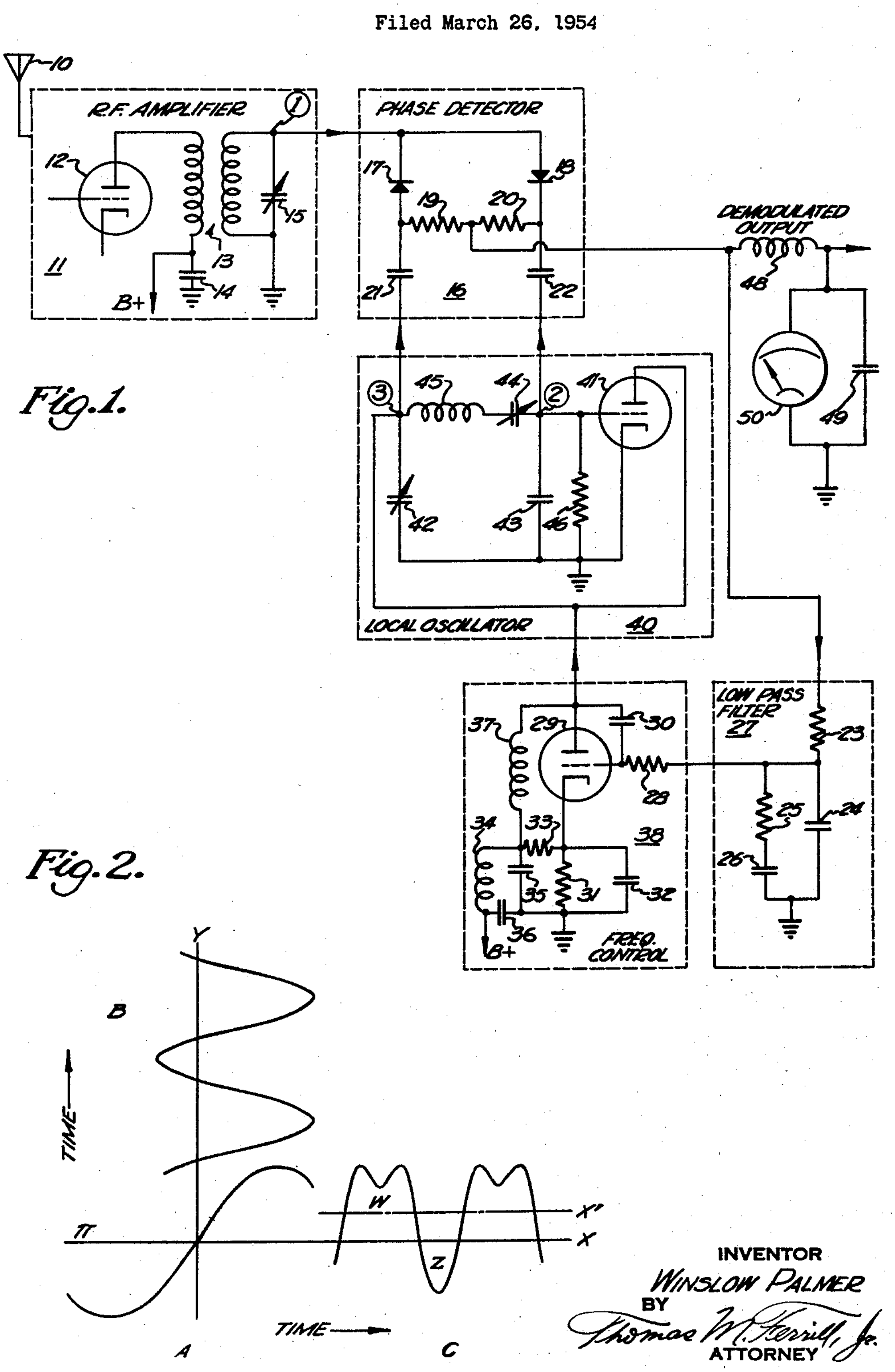

This invention relates to a demodulator for a frequency or phase modulated signal, and more particularly to a demodulator in which a locally generated signal having a frequency equal to the mean frequency of the received signal is added to the received signal.

In one type of long range radio navigation system, each of a plurality of widely separated radio stations transmits a different low frequency carrier wave phase modulated by a low frequency sine wave of about 200 cycles per second. The modulations of all carriers are identical in frequency and locked in phase. Navigation information is obtained by picking up each signal in a separate receiving channel and measuring the differences in phase between the various modulation frequency waves so obtained. Since the measured phase angles would be proportional to the differences in the distances to the respective transmitters, the phase angles define a set of hyperbolic lines of position intersecting at the position of the receiver.

To obtain maximum usefulness from the system it is necessary that all available means for receiving the signal through noise and interference be utilized to the utmost. It is known that most detection systems (including discriminators) possess rather sharply defined thresholds of detectability with signal-to-noise ratios of around 1:1. When the noise becomes greater than the signal it suppresses the signal in the detector or in a limiter, if one is used, and causes the effective signal-to-noise ratio in the output of the demodulator to go down much faster with increasing noise than the signal-to-noise ratio in the input to the system.

This invention provides a demodulator wherein a stable oscillator produces a balanced local signal which is combined in a balanced phase detector with the received signal. A portion of the demodulated output is fed through a low pass filter to a reactance tube which controls the frequency of the local oscillator so that the frequency of the local signal is maintained at the mean frequency of, and at a predetermined phase relation with, the received signal.

It is an object of this invention to provide an advantageous system for demodulating a phase or frequency modulated signal, the noise accompanying the signal being in amount equal to or greater than the signal, and in which the signal is not suppressed.

It is another object of this invention to provide an improved system for locally generating an electromagnetic wave having a frequency equal to the mean frequency of a phase or frequency modulated wave.

It is another object of this invention to provide a a phase or frequency demodulator in which a balanced phase detector is combined with a balanced and stable oscillator to provide a maximum of performance with a minimum of components.

Other objects will appear to those skilled in the art from a consideration of the following specification taken in conjunction with the accompanying drawings in which:

Fig. 1 is a schematic diagram of a demodulator embodying the principles of this invention, and Fig. 2 is a series of waveforms useful in explaining the operation of this invention.

In the demodulator shown in Fig. 1, the antenna 10 feeds into the radio frequency amplifier 11, the last stage of which, comprising vacuum tube 12 and transformer 13, is shown. The plate of tube 12 is connected through a primary of transformer 13 to B+. The junction of the primary of transformer 13 and B+ is connected through condenser 14 to ground. Variable tuning condenser 15 is connected across the secondary of transformer 13, one end of which is grounded and the other end of which, designated as terminal 1, is connected to the input of the phase detector 16.

In phase detector 16, the output from the radio frequency amplifier is connected to one terminal of each of two oppositely poled rectifiers 17 and 18. The other terminals of rectifiers 17 and 18 are connected together through equal resistors 19 and 20, the junction of which gives the demodulated output. The junction of rectifier 17 and resistor 19 is connected to one terminal of condenser 21. The junction of rectifier 18 and resistor 20 is connected to one terminal of condenser 22.

The demodulated output is connected to the input of a low pass filter 27 consisting of a series resistor 23 connected to the junction of condenser 24 and resistor 25. The other end of condenser 24 is connected to ground and the other end of resistor 25 is connected through condenser 26 to ground. The junction of resistors 23 and 25 and condenser 24 is the output terminal of the low pass filter and is connected through resistor 28 to the grid of triode 29 in the frequency control component 38.

The grid and plate of triode 29 are connected together through condenser 30. The cathode of triode 29 is connected to ground through resistor 31 and condenser 32 connected in parallel. The cathode of triode 29 is connected through a resistor 33 to the junction of inductance 34 and condenser 35. The other terminal of condenser 35 is connected to ground. The other terminal of inductance 34 is connected to condenser 36 whose other terminal is likewise grounded. The junction of inductance 34 and condenser 36 is connected to B+. The junction of resistor 33, condenser 35 and inductance 34 is connected through inductance 37 to the plate of triode 29.

The plate of triode 29 in the frequency control component 38 is connected to the plate of triode 41 in the local oscillator 40. The cathode of triode 41 is connected to the junction of one end of each of two substantially equal condensers 42 and 43, and to ground. The capacity of condenser 42 is variable through a small range. The grid of triode 41 is connected to the other end of condenser 43 and to one end of variable condenser 44, this junction being designated terminal 2. The other end of condenser 44 is connected through inductance 45 to the other end of condenser 42 which is also connected to the plate of triode 41. This latter junction is designated as terminal 3. A resistor 46 is connected between the grid and cathode of triode 41. Terminal 3 is connected to the end of condenser 21 remote from rectifier 17 in the phase detector 16. Terminal 2 is connected to the end of condenser 22 remote from rectifier 18 in the phase detector.

The demodulated output from the phase detector 16 appearing at the junction of resistors 19 and 20, Fig. 1, is fed through inductance 48 before being applied to the phase comparator component (not shown) of the navigational apparatus. The output end of inductance 48 is connected through a capacitor 49 to ground and through a meter 50 to ground. The entire circuit shown in Fig. 1 should be enclosed in a high quality shield.

In the operation of the device shown in Fig. 1 the condenser 15 tunes the secondary of transformer 13 to the signal frequency so that the received signal appears at terminal 1.

In a manner to be disclosed more in detail below, the local oscillator supplies at terminals 2 and 3 and to the phase detector equal and opposite radio frequency potentials at the mean frequency of the received radio frequency signal. If a positive sense is assigned to the reference wave at terminal 2 and a negative sense at terminal 3, summing the A.C. potentials from terminal 2 across condenser 43 and to ground and thence across capacitor 15 to terminal 1, and likewise from terminal 3 across condenser 42 to ground and thence across condenser 15 to terminal 1, will show that the vector difference of the received signal from amplifier 11 and the locally generated reference signal from oscillator 40 appears across the series combination of rectifier 18 and condenser 22 while the vector sum of the received signal and the locally generated reference signal appears across the series combination of rectifier 17 and condenser 21. Hence a direct potential of one polarity appears across condenser 22 whose magnitude is essentially the peak value of the vector difference of the received signal and the locally generated signal, and a direct potential of the opposite polarity will appear across capacitor 21 whose magnitude is substantially equal to the vector sum of the received signal and the locally generated signal. These potentials will be in addition to any direct potentials that exist across condensers 21 and 22 due to the plate and grid bias potentials of oscillator tube 41. Resistors 19 and 20 are equal; therefore, the potential at their junction will be one half the difference of the detected quantities which then constitutes the output of the phase detector 16.

The mean amplitude of the phase detector output is extracted by the low pass filter 27 consisting of the resistors 23 and 25 and the condensers 24 and 26 and is then applied to the control grid of triode 29 through resistor 28.

The operation of the system described above is illustrated by the waveforms of Fig. 2. The phase detector transfer characteristic is shown in waveform A as an essentially cosinusoidal function relating the phase detector output signal (along the X axis) to the relative phase of the received signal and the locally generated signal (along the Y axis). Waveform B shows the received signal plotted with the Y axis as time and the X axis as the phase relation between the received signal and the locally generated signal. Waveform B shows the received signal oscillating sinusoidally about a mean position which is not the phase of the locally generated signal but is approximately at a 45° phase angle with the locally generated signal. As the input phase swings back and forth about the mean position, the output wave of the phase detector will trace a distorted replica of the input waveform as shown in waveform C which is essentially the product of the instantaneous input signal phase and the phase detector transfer characteristic. Waveform C is plotted with amplitude along the Y axis and time along the X axis.

It should be noted especially that the distorted output wave C is always symmetrical in time about the maxima of the input wave. Therefore the phase of the fundamental component in the output for small mean phase displacements is independent of the mean phase angle between the incoming and reference signals. Output waveform C is not however symmetrical about the X axis but equal shaded areas W and Z fall on either side of the displaced axis X'. The displacement between X and X' indicates a direct voltage and it is this direct voltage which is used through the low pass filter 27 and the frequency control component 38 to control the frequency of the local oscillator 40. When the phase of the locally generated signal is at 90° with the mean phase position of the received signal, the equal shaded areas W and Z will fall on either side of the X axis; the axes X' and X will coincide. In this condition the output waveform C will become symmetrical about the X axis.

The mean amplitude of the phase detector output is extracted by the low pass filter 27 and is then applied to the control grid of triode 29 in the frequency control component 38 through the resistor 28. Triode 29 in the frequency control component 38 is a reactance tube connected across condenser 42 for the purpose of changing the frequency, or rate of change of phase, of the local oscillator 40 over a small range.

The reactance tube circuit consists of triode 29 the plate of which is connected in parallel with the plate of oscillator tube 41 and whose cathode is connected to a voltage divider made up of resistors 31 and 33 providing a fixed direct current bias for the cathode. A small excitation signal, which has a phase at 90° with respect to the alternating potential at the plate, is supplied to the grid of tube 29 by means of a reactive voltage divider consisting of the small capacity 30 and low resistance 28 so that the effective susceptance from plate to ground, presented by the reactance tube 29, which appears across capacitor 42 of the local oscillator, will have a relatively large value due to the 90° phase angle of the excitation. The amount of this susceptance is dependent upon the mutual conductance of triode 29 which in turn depends upon the direct current bias at the grid and hence on the mean phase detector output from the averaging filter 27.

The local oscillator 40 is of a type having a high stability. It is adapted to produce equal and opposite radio frequency potentials at terminals 2 and 3. It includes an amplifying triode 41 and a frequency determining network which is a single $\pi$ section reactance network with an inductance-capacitance series arm made up of inductance 45 and capacitor 44 and shunt arms consisting of equal capacitors 42 and 43. At the resonant frequency the reactance of the coil 45 is equal to the reactance of the combination of condensers 43, 42 and 44 in series. At this frequency the impedance at terminal 3 will be a pure resistance, and, since the same circulating current flows through equal condensers 43 and 42, equal and opposite voltages will appear at terminals 2 and 3. If the impedance presented at terminal 3 is sufficient that the gain of the tube is unity or more, the conditions for oscillation will be fulfilled and the circuit will oscillate.

It is a feature of this circuit that if the capacity of condenser 44 is made very much smaller than that of either of condensers 42 or 43, then the resonant frequency of oscillation will be, to a great degree but not altogether, independent of condensers 42 and 43 and hence of the grid-cathode and plate-cathode capacity of the oscillator tube 41 which are in parallel respectively with them. To provide an oscillator with an exceptionally high degree of stability, the circuit constants are selected such that capacitor 42 has a value that the impedance at terminal 3 is a little more than just sufficient to satisfy the unity loop gain requirement of the oscillator, and the reactances of coil 45 and capacitor 44 are made as large as is practically feasible, usually more than ten times the reactance of capacitors 42 or 43.

The equal and opposite voltages that are required at terminals 2 and 3 to satisfy the operational requirements of the phase detector are provided by making condensers 42 and 43 substantially equal in capacity. For optimum performance of the phase detector it is essential that the radio frequency potentials at terminals 2 and 3 be exactly equal. This is accomplished by a small adjustment of either condenser 42 or condenser 43, an adjustment which will have negligible effect on the oscillator frequency. The inductance 37 is a radio frequency choke with a reactance many times that of condenser 42. Plate potential is supplied to oscillator tube 41 and reactance tube 29 through inductance 37.

While the oscillator frequency is relatively independent of the reactance of condenser 42 the frequency is not completely independent of reactance to ground at this point and changes in the impedance presented by the reactance tube 29 will change the oscillator frequency by a small amount. Since only a very small change in frequency is necessary to correct the phase of the locally generated signal, sufficient control action can be obtained readily in this manner.

The automatic frequency control is a servo mechanism of the type wherein the error signal is smoothed in a low pass filter to remove noise and is then applied to control the rate of change of the controlled quantity. The response characteristics of such a servo mechanism are determined by the gain, in this case the ratio of frequency shift to phase error, and the smoothing filter time constant. For a given smoothing filter time constant there will be a maximum gain for which the system response is damped. If the product of the gain times the time constant exceeds .25 the response will be oscillatory. On the other hand if the gain is not made large then a substantial difference in phase between the locally generated signal and the mean received signal would be required to generate sufficient control signal to make the local oscillator frequency equal to the received signal carrier frequency over the error in frequency which may be expected of the local oscillator.

In this system a four element smoothing filter shown in block 27 is utilized to permit the gain to be made large and at the same time keep the servo response well behaved with a large smoothing filter time constant. The smoothing filter is made up of a series resistor 23 of seevral megohms and shunt condenser 26 of several microfarads, which provide the principal smoothing action. Resistor 25 is connected in series with condenser 26 and the control signal for the reactance tube 29 is taken from the junction of resistors 25 and 23 so that the control signal will consist of not only the smoothed error, but also of an element that is not smoothed. This unsmoothed portion of the error signal tends to make the control action more damped. Condenser 24 is then added to suppress as much as possible, unwanted variations at higher frequencies. Its capacity is kept small so that the time constant associated with it will not affect the servo stability.

In the phase detector of Fig. 1 a coherent local oscillation signal much larger than the noise is added to the received signal prior to detection so that the total effective signal at each detector 17 and 18 is much larger than the noise and therefore the suppression phenomena does not take place. However, this requires that the phase of the local reference be accurately maintained in phase with the carrier of the received signal.

In the system of Fig. 1, the bandpass of the radio frequency amplifier must be wide enough to carry the side bands of the modulation of the received wave. However, the low pass filter 27 supplying the control signal to the frequency control 38 need pass only the components related to the very slowly varying drift in phase between the stable local oscillator and the carrier of the received signal. Hence the effective bandwidth of the frequency control system can be very much narrower than that required to carry the modulation, with an attendant reduction in variation in phase between the locally generated signal and the received signal carrier so that an effective coherent demodulation system is achieved.

The local oscillator, of necessity, must operate with exactly the same frequency as the mean frequency of the received signal. If an appreciable portion of the local oscillator signal were to reach the input terminals of the signal amplifier 11 it would be amplified with the full gain of the system and would paralyze the operation of the device. Therefore the oscillator 40 and detector 16 must be very well shielded and it must be insured that no local oscillator signal escapes by any of the power or signal leads. The signal output lead is filtered by inductance 48 and condenser 49 and the plate supply input is filtered by inductor 34 and condenser 36. The entire circuit must be well shielded.

The indicating meter 50 connected to the output signal lead indicates the average signal and will read 0 when the oscillator frequency is tuned to exactly the frequency of the incoming signal carrier, indicating that no direct current control signal is needed to maintain correct phase relation. This meter can be used conveniently for aligning the system by tuning the frequency control condenser 44 for a zero or null indication between a positive and negative maximum. This adjustment presupposes that the frequency of the oscillator was not so greatly in error that the automatic frequency control could not lock the oscillator frequency to the carrier of the received signal.

It will be seen from the waveforms in Fig. 2 that even when the local oscillator phase is not held exactly at the mean phase of the received signal, so that the output wave from the phase detector is distorted as in waveform C, nevertheless the frequency and phase of the fundamental wave in this distorted output is exactly the frequency and the phase necessary for comparison in the latter stages of the navigation equipment to give accurate results.

It will be apparent to those skilled in the art that the demodulator herein disclosed will operate to indicate the phase of the low frequency wave modulated on the carrier even though the carrier is modulated by a number of additional frequencies. As an example the carrier could be modulated by a voice signal, to provide a communication channel without adversely affecting the operation of the navigation system.

It will be seen that the invention set forth herein provides a demodulator which demodulates a signal accompanied by a high ratio of noise without suppression of the signal, but also provides a demodulator in which a balanced detector is advantageously combined with a stable oscillator providing a balanced signal to achieve optimum results with a small number of parts.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a demodulator, a tuned circuit and first and second rectifiers, said rectifiers each having two poles and said tuned circuit having one output terminal which is connected to one pole of the first rectifier and to the opposite pole of the second rectifier, the other poles of said rectifiers being connected respectively through first and second equal resistors to an output junction, a stable oscillator having frequency determining elements including a single $\pi$ section reactive network with shunt arms consisting of equal capacitors and a series arm made up of inductance and capacity, said oscillator also including an electronic discharge device having at least an anode, cathode and control grid, one of the junctions of said equal condensers and said series arm being connected to the grid of said electronic discharge device and through a condenser to the junction of said other pole of one rectifier, the junction of said other equal condenser of said series arm being connected through a condenser to the other pole of the other rectifier, a frequency control component associated with said stable oscillator to control, within narrow limits, the frequency thereof, said frequency control component having an input which is connected through a low pass filter to said output junction.

2. The demodulator set forth in claim 1 in which the output of the oscillator is greater in amplitude than the output of the tuned circuit as applied to the input of the phase detector.

3. In a demodulator a tuned circuit and first and second rectifiers, said rectifiers each having two poles and said tuned circuit having one output terminal which is connected to one pole of the first rectifier and to the opposite pole of the second rectifier, the other poles of said rectifiers being connected respectively through first and second equal resistors to an output junction, a stable oscillator having an electronic discharge device including a plate, cathode and control grid, said stable oscillator having frequency determining elements including a single $\pi$ section reactive network with shunt arms consisting of equal capacitors and a series arm made up of inductance and capacity, one of the junctions of said equal condensers and said series arm being connected to the grid of said oscillating tube and through a condenser to the junction of said other pole of one rectifier, the junction of said other equal condenser and said series arm being connected to the plate of said electronic discharge device and through a condenser to the other pole of the other rectifier, the junction of said equal condensers being connected to the cathode of said oscillator tube, a reactance tube having a plate, cathode and control grid, the plate-cathode path of said reactance tube being connected in shunt with one of said equal condensers, the grid of said reactance tube being connected to the plate of said reactance tube through a condenser and to said output terminal through a low pass filter.

4. The demodulator set forth in claim 3 in which the output of the oscillator applied to the phase detector is greater in amplitude than the output of the tuned circuit as applied to the input of the phase detector.

References Cited in the file of this patent

UNITED STATES PATENTS

| | | |
|---|---|---|
| 2,066,528 | Harper | Jan. 5, 1937 |
| 2,231,704 | Curtis | Feb. 11, 1941 |
| 2,231,997 | Guanella | Feb. 18, 1941 |
| 2,464,818 | Learned | Mar. 22, 1949 |
| 2,494,795 | Bradley | Jan. 17, 1950 |
| 2,564,205 | Hugenholtz | Aug. 14, 1951 |
| 2,617,037 | Hugenholtz | Nov. 4, 1952 |
| 2,623,177 | Hugenholtz | Dec. 23, 1952 |
| 2,680,830 | Sulzer | June 8, 1954 |

OTHER REFERENCES

"Radio Engineering," by F. E. Terman, 3rd edition, copyright 1947, McGraw-Hill Book Co., New York.

"The Ratio Detector," by Seeley (reprinted from RCA Review, June 1947, vol. 8, No. 2).